(12) United States Patent
Taniguchi et al.

(10) Patent No.: US 10,487,225 B2
(45) Date of Patent: *Nov. 26, 2019

(54) OIL-BASED INK JET RECORDING LIQUID

(71) Applicant: Seiko Epson Corporation, Tokyo (JP)

(72) Inventors: Manabu Taniguchi, Shiojiri (JP); Shigemi Wakabayashi, Azumino (JP)

(73) Assignee: Seiko Epson Corporation (JP)

( * ) Notice: Subject to any disclaimer, the term of this patent is extended or adjusted under 35 U.S.C. 154(b) by 6 days.

This patent is subject to a terminal disclaimer.

(21) Appl. No.: 15/894,069

(22) Filed: Feb. 12, 2018

(65) Prior Publication Data

US 2018/0265719 A1    Sep. 20, 2018

(30) Foreign Application Priority Data

Mar. 17, 2017    (JP) ................................ 2017-052520

(51) Int. Cl.
| | |
|---|---|
| *C09D 11/06* | (2006.01) |
| *C09D 11/326* | (2014.01) |
| *C09D 11/36* | (2014.01) |
| *C09D 11/38* | (2014.01) |

(52) U.S. Cl.
CPC ............ *C09D 11/06* (2013.01); *C09D 11/326* (2013.01); *C09D 11/36* (2013.01); *C09D 11/38* (2013.01)

(58) Field of Classification Search
CPC ......... C09D 11/06; C09D 11/36; C09D 11/38; C09D 11/033; C09D 11/326
USPC .......................................... 523/160
See application file for complete search history.

(56) References Cited

U.S. PATENT DOCUMENTS

| | | | |
|---|---|---|---|
| 10,246,597 B2* | 4/2019 | Wakabayashi | C09D 11/36 |
| 2008/0125511 A1 | 5/2008 | Nakano et al. | |
| 2009/0110843 A1 | 4/2009 | Halahmi et al. | |
| 2013/0220171 A1 | 8/2013 | Hosoya et al. | |
| 2017/0121546 A1* | 5/2017 | Wakabayashi | C09D 11/36 |
| 2017/0210941 A1* | 7/2017 | Wakabayashi | C09D 173/02 |

FOREIGN PATENT DOCUMENTS

| | | |
|---|---|---|
| CN | 101250354 A | 8/2008 |
| JP | 2004-217703 A | 8/2004 |
| JP | 2009-275211 A | 11/2009 |
| JP | 2010-241008 A | 10/2010 |
| JP | 2012-097172 A | 5/2012 |
| JP | 2013-047289 A | 3/2013 |
| JP | 2013-166813 A | 8/2013 |
| JP | 5739643 B2 | 6/2015 |

\* cited by examiner

*Primary Examiner* — Hannah J Pak

(74) *Attorney, Agent, or Firm* — Harness, Dickey & Pierce, P.L.C.

(57) ABSTRACT

An oil-based ink jet recording liquid includes a colorant and an oxidatively polymerizable oil-based medium having at least two unsaturated bonds. The ink jet recording liquid has an iodine value of greater than or equal to 65.

6 Claims, No Drawings

OIL-BASED INK JET RECORDING LIQUID

BACKGROUND

1. Technical Field

The present invention relates to an oil-based ink jet recording liquid.

2. Related Art

Ink jet recording methods make it possible to record high-resolution images by using a relatively simple device, and rapid progress in such methods is being made in a variety of fields. In such circumstances, various studies have been carried out to, for example, inhibit image strike-through. For example, JP-A-2012-97172 intended to provide a non-aqueous pigment ink capable of inhibiting strike-through and achieving a high print density while ensuring pigment dispersion stability and ejection stability. The non-aqueous pigment ink contains a non-aqueous solvent and a pigment that is self-dispersible in the solvent. The self-dispersible pigment is treated with a compound represented by the general formula $R^1$—X or $R^2$—Y—$R^3$ where X is —SH, —NCO, —$NH_2$, or —NHR (R is an alkyl group), Y is —CO—O—O—CO— or —CO—O—O—, $R^1$, $R^2$, and $R^3$ are alkyl groups that have from 8 to 22 carbon atoms and may be linear or branched, and $R^2$ and $R^3$ may be the same or different.

However, it has been discovered that merely introducing a long-chain alkyl group onto the pigment surface by grafting, as disclosed in JP-A-2012-97172, cannot completely inhibit an ink composition from penetrating a recording medium over time and is therefore insufficient to prevent strike-through that occurs over time. One possible approach for reducing strike-through would be to increase viscosity. However, ink compositions with increased viscosity have a problem of poor filling characteristics, in particular, initial filling characteristics, for filling a recording device.

The present inventors diligently performed studies to solve the problems described above. As a result, they found that the use of a predetermined oil-based medium can solve the problem and have thus completed the invention.

SUMMARY

An advantage of some aspects of the invention is that an oil-based ink jet recording liquid having excellent image quality stability and excellent initial filling characteristics is provided.

That is, an oil-based ink jet recording liquid according to the invention includes a colorant and an oxidatively polymerizable oil-based medium having at least two unsaturated bonds. The ink jet recording liquid has an iodine value of greater than or equal to 65. Preferred embodiments of the invention may be as follows. A content of the oil-based medium, based on the total amount of the oil-based ink jet recording liquid, is greater than or equal to 10 mass %. The oil-based medium may have an iodine value of greater than or equal to 150. The oil-based medium may include an allyl compound having a structure represented by formula (1), which will be described later. The oil-based medium may further include a metal soap or a metal complex. A metal component in the metal soap or the metal complex may be at least one selected from the group consisting of Co, Mn, Pb, Zr, Ca, Ba, K, and Fe.

DESCRIPTION OF EXEMPLARY EMBODIMENTS

An embodiment of the invention (hereinafter referred to as "this embodiment") will be described in detail below. However, the invention is not limited to the embodiment, and various modifications may be made thereto without departing from the scope of the invention.

Oil-Based Ink Jet Recording Liquid

An oil-based ink jet recording liquid according to this embodiment includes a colorant and an oxidatively polymerizable oil-based medium having at least two unsaturated bonds. The ink jet recording liquid has an iodine value of greater than or equal to 65. Herein, the number of unsaturated bonds refers to the number of unsaturated bonds per molecule.

Colorant

The colorant may be at least one of a pigment and a dye.

Pigment

The pigment may be an inorganic pigment or an organic pigment. Examples of the inorganic pigment include, but are not limited to: carbon blacks (C.I. pigment black 7), such as furnace black, lamp black, acetylene black, and channel black; iron oxides; and titanium oxides. Examples of the organic pigment include, but are not limited to: azo pigments, such as insoluble azo pigments, condensed azo pigments, azo lakes, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye type chelates and acidic dye type chelates); dye lakes (e.g., basic dye type lakes and acidic dye type lakes); nitro pigments; nitroso pigments; aniline black; and daylight fluorescent pigments.

Dye

Examples of the dye include, but are not limited to, acidic dyes, direct dyes, reactive dyes, and basic dyes. Examples of such dyes include C.I. Acid Yellows 17, 23, 42, 44, 79, 142; C.I. Acid Reds 52, 80, 82, 249, 254, 289; C.I. Acid Blues 9, 45, 249; C.I. Acid Blacks 1, 2, 24, 94; C.I. Food Blacks 1, 2; C.I. Direct Yellows 1, 12, 24, 33, 50, 55, 58, 86, 132, 142, 144, 173; C.I. Direct Reds 1, 4, 9, 80, 81, 225, 227; C.I. Direct Blues 1, 2, 15, 71, 86, 87, 98, 165, 199, 202; C.I. Direct Blacks 19, 38, 51, 71, 154, 168, 171, 195; C.I. Reactive Reds 14, 32, 55, 79, 249; and C.I. Reactive Blacks 3, 4, 35.

The content of the colorant, based on the total amount of the oil-based ink jet recording liquid, is preferably greater than or equal to 1 mass %, more preferably greater than or equal to 2 mass %, and still more preferably greater than or equal to 3 mass %. Also, the content of the colorant, based on the total amount of the oil-based ink jet recording liquid, is preferably less than or equal to 10 mass %, more preferably less than or equal to 7.5 mass %, and still more preferably less than or equal to 5 mass %. When the content of the colorant is within the above ranges, color development over time tends to be further improved.

Oxidatively Polymerizable Oil-Based Medium Having at Least Two Unsaturated Bonds Examples of the oxidatively polymerizable oil-based medium having at least two unsaturated bonds include, but are not limited to, allyl compounds having a structure represented by the following formula (1). As used herein, the term "oil-based" refers to the characteristics of being incompatible with water.

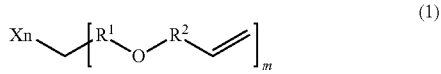

(1)

Here, $R^1$ and $R^2$ each independently represent a divalent alkyl group having from 1 to 3 carbon atoms, Xn represents hydrogen, a hydroxyl group, an alkyl group having from 1 to 6 carbon atoms, an alkylol group having from 1 to 3 carbon atoms, or an allyl alkoxy alkyl group represented by the following formula (2), m is an integer from 1 to 3, and n is an integer satisfying m+n=4.

(2)

Here, $R^3$ and $R^4$ each independently represent a divalent alkyl group having from 1 to 3 carbon atoms.

Examples of the oxidatively polymerizable oil-based medium having at least two unsaturated bonds include, but are not limited to, unsaturated fatty acids having at least two unsaturated bonds, such as isopropyl linoleate and methyl linolenate, and derivatives thereof. With an increasing number of unsaturated bonds in a medium, the molecular geometry of the media is increasingly bent and consequently intermolecular forces (surface tension) decrease. As a result, the media tends to exhibit further improved wettability.

The iodine value of the oil-based medium is preferably greater than or equal to 150, more preferably greater than or equal to 175, and still more preferably greater than or equal to 200. When the iodine value of the oil-based medium is greater than or equal to 150, the wettability of the ink composition is further improved and the escape of air bubbles is further facilitated. As a result, the initial filling characteristics tend to be further improved. Furthermore, the ink composition, after being applied to a recording medium, becomes viscous easily, and therefore strike-through of the coloring agent is inhibited. As a result, changes in the OD value over time tend to be further inhibited.

The content of the oxidatively polymerizable oil-based medium having at least two unsaturated bonds, based on the total amount of the oil-based ink jet recording liquid, is preferably greater than or equal to 10 mass %, more preferably greater than or equal to 15 mass %, and still more preferably greater than or equal to 20 mass %. Also, the content of the oxidatively polymerizable oil-based medium having at least two unsaturated bonds, based on the total amount of the oil-based ink jet recording liquid, is preferably less than or equal to 90 mass %, more preferably less than or equal to 80 mass %, and still more preferably less than or equal to 70 mass %. When the content of the oxidatively polymerizable oil-based medium having at least two unsaturated bonds is greater than or equal to 10 mass %, the wettability of the ink composition is further improved and the escape of air bubbles is further facilitated. As a result, the initial filling characteristics tend to be further improved. Furthermore, the ink composition, after being applied to a recording medium, becomes viscous easily, and therefore strike-through of the coloring agent is inhibited. As a result, changes in the OD value over time tend to be further inhibited.

Oil-Based Medium Other than Oxidatively Polymerizable Oil-Based Medium Having at Least Two Unsaturated Bonds The oil-based ink jet recording liquid of this embodiment may include another oil-based medium or other oil-based media (hereinafter also referred to as other oil-based media for convenience) in addition to the oxidatively polymerizable oil-based medium having at least two unsaturated bonds described above. Examples of other oil-based media include, but are not limited to: saturated fatty acids, such as methyl palmitate, and derivatives thereof; and unsaturated fatty acids having one unsaturated bond, such as 2-ethylhexyl oleate and methyl oleate, and derivatives thereof.

The content of another oil-based medium, based on the total amount of the oil-based ink jet recording liquid, is preferably greater than or equal to 30 mass %, more preferably greater than or equal to 35 mass %, and still more preferably greater than or equal to 40 mass %. Also, the content of another oil-based medium, based on the total amount of the oil-based ink jet recording liquid, is preferably less than or equal to 70 mass %, more preferably less than or equal to 65 mass %, and still more preferably less than or equal to 60 mass %. When the content of another oil-based medium is within the above ranges, excessive thickening of the ink composition is further inhibited and the initial filling characteristics tend to be further improved.

Metal Soap or Metal Complex

The oil-based ink jet recording liquid of this embodiment may further include a metal soap or a metal complex. As used herein, the term "metal soap" generally refers to a metal salt of a long-chain fatty acid, where the metal is a metal other than sodium or potassium. As used herein, the metal complex refers to a compound which includes a metal or metal ion at the center of the molecule and ligands surrounding the metal or metal ion. The ligands have one or more lone pairs of electrons. The metal soap or metal complex may have a function of catalyzing the polymerization of unsaturated bonds of the oil-based medium. With the use of a metal soap or metal complex, the ink composition, after being applied to a recording medium, becomes viscous more easily than in the case where a metal soap or metal complex is not used, and therefore strike-through of the coloring agent is inhibited. As a result, changes in the OD value over time tend to be further inhibited.

It is preferable that the metal component in the metal soap or metal complex be at least one selected from the group consisting of Co, Mn, Pb, Zr, Ca, Ba, K, and Fe. With the use of such a metal soap or metal complex, the ink composition, after being applied to a recording medium, becomes viscous more easily than in the case where such a metal soap or metal complex is not used, and therefore strike-through of the coloring agent is inhibited. As a result, changes in the OD value over time tend to be further inhibited.

The content of the metal soap or metal complex, based on the total amount of the oil-based ink jet recording liquid, is preferably greater than or equal to 0.1 mass %, more preferably greater than or equal to 0.25 mass %, and still more preferably greater than or equal to 0.5 mass %. Also, the content of the metal soap or metal complex, based on the total amount of the oil-based ink jet recording liquid, is preferably less than or equal to 5 mass %, more preferably less than or equal to 3 mass %, and still more preferably less than or equal to 2.5 mass %. When the content of the metal soap or metal complex is greater than or equal to 0.1 mass %, the ink composition, after being applied to a recording medium, becomes viscous more easily than in the case where the content of a metal soap or metal complex is less than 0.1 mass %, and therefore strike-through of the coloring agent is inhibited. As a result, changes in the OD value over time tend to be further inhibited. Furthermore, when the content of the metal soap or metal complex is less than or equal to 5 mass %, the ink composition is more satisfactorily inhibited from becoming viscous before being applied to a recording medium.

Iodine Value

The iodine value of the oil-based ink jet recording liquid of this embodiment is greater than or equal to 65, preferably greater than or equal to 75, more preferably greater than or equal to 100, and still more preferably greater than or equal to 110. Also, the iodine value of the oil-based ink jet recording liquid of this embodiment is preferably less than or equal to 300, more preferably less than or equal to 250, and still more preferably less than or equal to 200. When the iodine value is greater than or equal to 65, the wettability of the ink composition is further improved and the initial filling characteristics are further improved. Furthermore, the ink composition, after being applied to a recording medium, becomes viscous easily, and therefore strike-through of the coloring agent is inhibited. As a result, changes in the OD value over time tend to be further inhibited. The iodine value can be measured using the method described in the example. The iodine value can be adjusted by the ink components.

Recording Process

In this embodiment, any recording process may be used provided that the process includes ejection of the oil-based ink jet recording liquid onto a recording medium and application of the liquid thereto. The process may further include active curing of the oil-based medium by, for example, heating.

Recording Medium

Examples of the recording medium include absorbent recording media and non-absorbent recording media. From the standpoint of inhibiting changes in the OD value over time, absorbent recording media are preferred.

Examples of the absorbent recording medium include, but are not limited to: plain paper having good ink penetration properties, such as electrophotographic paper; ink jet paper (paper for exclusive use in ink jet recording including an ink-absorbent layer made of, for example, silica particles or alumina particles, or an ink-absorbent layer made of a hydrophilic polymer, such as polyvinyl alcohol (PVA) or polyvinyl pyrrolidone (PVP)); and paper used for offset printing in general, which has relatively low ink penetration properties, such as art paper, coated paper, and cast-coated paper.

Examples of the non-absorbent recording medium include, but are not limited to, films or plates made from one or more plastic materials, such as polyvinyl chloride, polyethylene, polypropylene, polyethylene terephthalate (PET), polycarbonate, polystyrene, and polyurethane; plates made from one or more metals, such as iron, silver, copper, and aluminum; metal plates or plastic films having an evaporated film of any of the above-mentioned metals, and alloy plates such as stainless steel plates and brass plates; and paper substrates having a film bonded thereto (coated thereon), the film being made from one or more plastic materials, such as polyvinyl chloride, polyethylene, polypropylene, polyethylene terephthalate (PET), polycarbonate, polystyrene, and polyurethane.

EXAMPLES

Hereinafter, the invention will be described more specifically with reference to examples and comparative examples. The invention is not limited in any way by the examples described below.

Ink Composition Materials

The ink compositions used in the examples and comparative examples described below primarily included the following materials.

Colorant

Carbon black #2350 (manufactured by Mitsubishi Chemical Corporation)

Dispersant

Solsperse 13940 (manufactured by The Lubrizol Corporation)

Oil-Based Medium

Isopropyl linoleate (iodine value: 120; number of unsaturated bonds: 2)

Methyl linolenate (iodine value: 267; number of unsaturated bonds: 3)

Allyl ether P40 (manufactured by OSAKA SODA CO., LTD.; iodine value: 396; number of unsaturated bonds: 4)

Methyl palmitate (iodine value: 0; number of unsaturated bonds: 0)

AF-7 (manufactured by JXTG Nippon Oil & Energy Corporation; iodine value: 1; number of unsaturated bonds: 0).

2-ethylhexyl oleate (iodine value: 64; number of unsaturated bonds: 1)

Methyl oleate (iodine value: 80; number of unsaturated bonds: 1)

Metal Soap or Metal Complex

Fe complex (manufactured by Borchers, product name: OXY-COAT 1410)

Iodine Value Measurement Method

Measurement of the iodine values of the oil-based medium and the ink composition was performed according to JIS K 0070. Specifically, the iodine value was determined by titration in the following manner. The sample was dissolved in carbon tetrachloride, and next an iodine monochloride solution was added thereto, and the mixture was allowed to stand in a dark place. Thereafter, potassium iodide and water were added to the mixture and a sodium thiosulfate solution was added dropwise thereto. When the color of the solution turned light yellow, a starch solution was added dropwise until the blue color disappeared.

Ink Composition Preparation

In Examples 1 to 11 and Comparative Examples 1 to 4, the materials were placed in a 20 L stainless steel container in accordance with the composition ratio shown in Table 1. The materials were stirred for 1 hour using a dissolver manufactured by INOUE MFG., INC. to produce a mill base. The mill base was subjected to a dispersion process using a bead mill, LMZ, manufactured by Ashizawa Finetech Ltd. (peripheral speed: 12 m/s; beads used: zirconia, φ 0.1 mm; beads filling factor: 85%) in pass mode for 5 passes. Thereafter, a centrifugation process was performed at an acceleration of 11000 G for 20 minutes using a centrifuge (CR7N) manufactured by Hitachi Koki Co., Ltd. Each of the resultant liquids was filtered through a 3 μm filter to give each of the ink compositions. In Table 1, values are presented on a mass % basis, with the total being 100.0 mass %.

TABLE 1

|  |  | Example 1 | Example 2 | Example 3 | Example 4 | Example 5 | Example 6 | Example 7 | Example 8 |
|---|---|---|---|---|---|---|---|---|---|
| Colorant | Carbon black #2350 | 5 | 5 | 5 | 5 | 5 | 5 | 5 | 5 |
| Dispersant | Solsperse 13940 | 3 | 3 | 3 | 3 | 3 | 3 | 3 | 3 |
| Oil-based medium | Isopropyl linoleate (iodine value: 120/number of unsaturated bonds: 2) | 46 | 61 | 92 | — | — | — | — | — |
|  | Methyl linolenate (iodine value: 267/number of unsaturated bonds: 3) | — | — | — | 5 | 10 | 23 | 30 | — |
|  | Allyl ether P40 (iodine value: 396/number of unsaturated bonds: 4) | — | — | — | — | — | — | — | 5 |
|  | Methyl palmitate (iodine value: 0/number of unsaturated bonds: 0) | 46 | 31 | — | 11 | 32 | 49 | 12 | 11 |
|  | AF-7 (iodine value: 2/number of unsaturated bonds: 0) | — | — | — | — | — | 20 | — | — |
|  | 2-Ethylhexyl oleate (iodine value: 64/number of unsaturated bonds: 1) | — | — | — | 76 | 50 | — | 50 | 76 |
|  | Methyl oleate (iodine value: 80/number of unsaturated bonds: 1) | — | — | — | — | — | — | — | — |
| Metal complex, Metal soap | Fe complex | — | — | — | — | — | — | — | — |
| Iodine value of ink |  | 67 | 86 | 120 | 67 | 65 | 78 | 111 | 72 |
| Evaluation | Image quality stability | 3 | 3 | 4 | 3 | 4 | 4 | 4 | 3 |
|  | Initial filling characteristics | 3 | 4 | 5 | 3 | 4 | 5 | 5 | 3 |

|  |  | Example 9 | Example 10 | Example 11 | Comparative example 1 | Comparative example 2 | Comparative example 3 | Comparative example 4 |
|---|---|---|---|---|---|---|---|---|
| Colorant | Carbon black #2350 | 5 | 5 | 5 | 5 | 5 | 5 | 5 |
| Dispersant | Solsperse 13940 | 3 | 3 | 3 | 3 | 3 | 3 | 3 |
| Oil-based medium | Isopropyl linoleate (iodine value: 120/number of unsaturated bonds: 2) | — | — | — | — | — | — | 35 |
|  | Methyl linolenate (iodine value: 267/number of unsaturated bonds: 3) | — | — | — | — | — | — | — |
|  | Allyl ether P40 (iodine value: 396/number of unsaturated bonds: 4) | 10 | 20 | 30 | — | — | — | — |
|  | Methyl palmitate (iodine value: 0/number of unsaturated bonds: 0) | 32 | 22 | 61 | 92 | 36 | 16 | 57 |
|  | AF-7 (iodine value: 2/number of unsaturated bonds: 0) | — | — | — | — | — | — | — |
|  | 2-Ethylhexyl oleate (iodine value: 64/number of unsaturated bonds: 1) | 50 | 50 | — | — | 56 | — | — |
|  | Methyl oleate (iodine value: 80/number of unsaturated bonds: 1) | — | — | — | — | — | 76 | — |
| Metal complex, Metal soap | Fe complex | — | — | 1 | — | — | — | — |
| Iodine value of ink |  | 77 | 111 | 131 | 0 | 45 | 67 | 50 |
| Evaluation | Image quality stability | 4 | 4 | 5 | 1 | 1 | 2 | 2 |
|  | Initial filling characteristics | 4 | 5 | 5 | 2 | 3 | 3 | 3 |

Image Quality Stability

A printer (manufactured by SEIKO EPSON CORPORATION, product name: EPSON WorkForce M105) was filled with the ink composition obtained as described above. The ink composition was ejected onto a recording medium to be applied thereto. The OD values of the resultant printed article immediately after printing and three days after printing were measured using Spectrolino (manufactured by Gretag). Based on the difference between the two obtained OD values, the image quality stability was evaluated using the following evaluation criteria.

Evaluation Criteria

5: Difference in OD value was not greater than 0.01

4: Difference in OD value was greater than 0.01 and not greater than 0.10

3: Difference in OD value was greater than 0.10 and not greater than 0.15

2: Difference in OD value was greater than 0.15 and not greater than 0.20

1: Difference in OD value was greater than 0.2

Initial Filling Characteristics

An ink tank of the printer (manufactured by SEIKO EPSON CORPORATION, product name: EPSON WorkForce M105) was filled with the ink composition obtained as described above. Subsequently, the ink was introduced to the head in accordance with the initial filling sequence specified for the printer. Subsequently, a nozzle check was performed to see whether the ink was ejected through all the nozzles of the head. Based on the results of the nozzle check, the initial filling characteristics were evaluated using the following evaluation criteria.

Evaluation Criteria

5: Occurrence of missing nozzles was 0%.

4: Occurrence of missing nozzles was greater than 0% and not greater than 5%.

3: Occurrence of missing nozzles was greater than 5% and not greater than 10%.

2: Occurrence of missing nozzles was greater than 10% and not greater than 15%.

1: Occurrence of missing nozzles was greater than 15%.

The entire disclosure of Japanese Patent Application No. 2017-052520, filed Mar. 17, 2017 is expressly incorporated by reference herein.

What is claimed is:

1. An oil-based ink jet recording liquid comprising:
a colorant; and
an oxidatively polymerizable oil-based medium having at least two unsaturated bonds,
wherein the ink jet recording liquid has an iodine value of greater than or equal to 65.

2. The oil-based ink jet recording liquid according to claim 1, wherein a content of the oil-based medium, based on the total amount of the oil-based ink jet recording liquid, is greater than or equal to 10 mass %.

3. The oil-based ink jet recording liquid according to claim 1, wherein the oil-based medium has an iodine value of greater than or equal to 150.

4. The oil-based ink jet recording liquid according to claim 1, wherein the oil-based medium includes an allyl compound having a structure represented by the following formula (1),

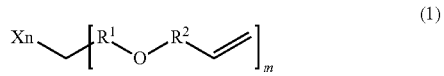

where $R^1$ and $R^2$ each independently represent a divalent alkyl group having from 1 to 3 carbon atoms, Xn represents hydrogen, a hydroxyl group, an alkyl group having from 1 to 6 carbon atoms, an alkylol group having from 1 to 3 carbon atoms, or an allyl alkoxy alkyl group represented by the following formula (2), m is an integer from 1 to 3, and n is an integer satisfying m+n=4,

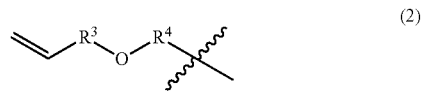

where $R^3$ and $R^4$ each independently represent a divalent alkyl group having from 1 to 3 carbon atoms.

5. The oil-based ink jet recording liquid according to claim 1, further comprising a metal soap or a metal complex.

6. The oil-based ink jet recording liquid according to claim 5, wherein a metal component in the metal soap or the metal complex is at least one selected from the group consisting of Co, Mn, Pb, Zr, Ca, Ba, K, and Fe.

* * * * *